United States Patent
Niitsuma

(10) Patent No.: US 8,368,941 B2
(45) Date of Patent: Feb. 5, 2013

(54) IMAGE PROCESSING APPARATUS, IMAGE PROCESSING METHOD AND PROGRAM FOR FORMING AN IMAGE BASED ON MERGED IMAGE DATA

(75) Inventor: Tetsuya Niitsuma, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1496 days.

(21) Appl. No.: 11/447,770

(22) Filed: Jun. 6, 2006

(65) Prior Publication Data
US 2007/0211304 A1    Sep. 13, 2007

(30) Foreign Application Priority Data
Mar. 8, 2006    (JP) ................... 2006-062924

(51) Int. Cl.
G06K 15/00    (2006.01)
(52) U.S. Cl. ....................................... 358/1.18
(58) Field of Classification Search ............. 358/1.9, 358/1.18, 520, 448
See application file for complete search history.

(56) References Cited

U.S. PATENT DOCUMENTS
6,160,629 A * 12/2000 Tang et al. ................. 358/1.1
2002/0030836 A1* 3/2002 Motoyama ................. 358/1.9

FOREIGN PATENT DOCUMENTS
| JP | 7-85024 A | 3/1995 |
| JP | 2000-358151 A | 12/2000 |
| JP | 2003/032475 A | 1/2003 |
| JP | 2003-274151 A | 9/2003 |

OTHER PUBLICATIONS

Japanese Office Action dated Jun. 15, 2010 and English translation thereof, issued in counterpart Japanese Application No. 2006-062924.

* cited by examiner

Primary Examiner — Benny Q Tieu
Assistant Examiner — Jeremiah Bryar
(74) Attorney, Agent, or Firm — Holtz, Holtz, Goodman & Chick, PC

(57) ABSTRACT

An image processing apparatus is provided which includes an image obtaining member which obtains an original image and outputs data of the original image. In the image processing apparatus, unique additional image data is merged to the original image data. A memory stores the original image data and the merged image data, and an image is formed based on the formed merged image data. In a first image processing mode, the merged image data is formed before the original data is stored to the memory, and the merged image data is then stored to the memory and an image is formed based on the stored merged image data. In a second image processing mode, the original image data is stored to the memory before forming the merged image data. Then the merged image data is formed, and an image is formed based on the formed merged image data.

6 Claims, 12 Drawing Sheets

IMAGE PROCESSING APPARATUS, IMAGE PROCESSING METHOD AND PROGRAM FOR FORMING AN IMAGE BASED ON MERGED IMAGE DATA

CROSS-REFERENCE TO RELATED APPLICATION

The present U.S. patent application claims a priority under the Paris Convention of Japanese patent application No. 2006-62924 filed on Mar. 8, 2006, and shall be a basis of correction of an incorrect translation.

BACKGROUND

1. Field of the Invention

The present invention relates to an image processing apparatus, an image processing method and a program, especially to an image processing apparatus, an image processing method and a program which overlap an unique additional image to each image.

2. Description of Related Art

In recent years, it has been sometimes required to ensure uniqueness of an image, that is, continuity of image data is ensured from forming, receiving or transmitting of the image data and the image data has not been subject to falsification or the like afterward such as insertion of other image data.

In this regard, an image forming apparatus is disclosed, in which page numbers are added in each cycle of successive image forming, so as to be capable of forming images with continuous page numbers (for example, see JP 2003-274151A).

However, in the case an additional image such as page number is added to image data, when the additional image is outputted to be overlapped with a document in the image data, there occurs an inconvenience of difficulty to read the document.

In this regard, an image processing apparatus is disclosed in which a proof mode is available other than a normal print mode, and when the proof mode is selected, simplified image information is output (for example, see JP Hei07-85024A). Also, an image processing apparatus is disclosed, in which cutting-line data is merged to image data for printing and the merged image data for printing is output so as to form a proof (for example, see JP 2003-32475A). According to these images processing apparatus, an outputted image can be checked efficiently whether or not the outputted image is appropriate, such as a layout check.

However, when image data is overlapped with an additional image at the stage of outputting the image, there is a problem of difficulty to ensure that the additional image is unique with respect to the image. On the other hand, as described above, when image data is overlapped with an additional image at the stage of reading the image, there is a problem of difficulty to adjust overlapping position of the additional image.

SUMMARY

The present invention has been made to solve the above-described problems. It is one of objects of the present invention to provide an image processing apparatus, image processing method and program which can ensure uniqueness of image data while position of a stamp is adjustable according to need.

In order to attain the above-described object, according to a first aspect of the invention, an image processing apparatus comprises:

an image obtaining member which obtains an original image and outputs original image data of the original image, a first merging member which merges unique additional image data to the original image data so as to form merged image data in a page basis, the unique additional image data being added page by page, a memory for storage which stores the original image data and/or the merged image data, a second merging member which merges the unique additional image data to the original image data which is stored in the memory for storage so as to form the merged image data in a page basis, a controller which operates the first merging member or the second merging member selectively, and a image forming member which forms an image based on the merged image data formed in the first merging member or the second merging member.

According to a second aspect of the invention, an image processing apparatus comprises:

an image obtaining member which obtains an original image and outputs original image data of the original image, a merging member which merges unique additional image data to the original image data so as to form merged image data in a page basis, the unique additional image data being added page by page, a memory which stores the original image data and the merged image data, an image forming member which forms an image based on the merged image data formed in the merging member, and a controller which executes a first mode or a second mode selectively, in which the first mode is to form the merged image data in the merging member before the original image data is stored to the memory, to store the merged image data to the memory, to read the merged image data stored in the memory, and to form an image by the image forming member, and in which the second mode is to read the original image data from the memory after the original image data is once stored to the memory, to form the merged image data in the merging member, and to form an image by the image forming member.

BRIEF DESCRIPTION OF THE DRAWING

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENTS

Hereinafter, the first embodiment of the present invention is described with reference to FIGS. 1 to 13. It is noted that the scope of the invention is not limited to the illustrated examples.

Figure 1:
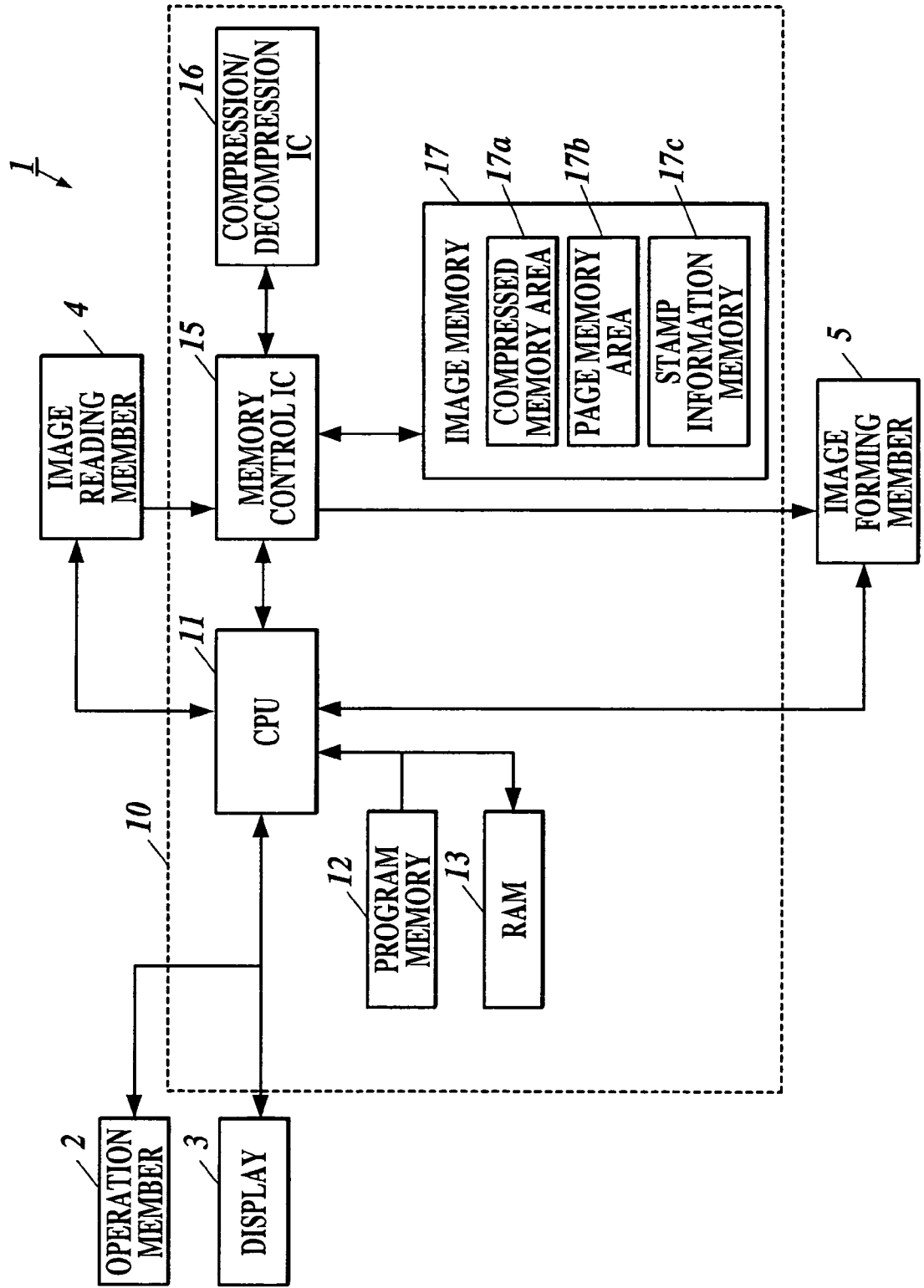
FIG. 1 is a block diagram showing schematic constitution of a first embodiment of the present invention.

First, constitution of an image processing apparatus 1 of the present embodiment is described with reference to FIG. 1. The image processing apparatus 1 of the present embodiment is, for example, a MFP (multi function peripheral). The image processing apparatus 1 comprises an operation member 2, display 3, image reading member 4, image forming member 5/and status management member 10 to control these members wholly.

The operation member 2 functions as a setting member to accept user's various directions so as to perform various setting of selections. The operation member 2, for example, comprises various operation buttons (not illustrated) such as a numeral button, function button to switch various setting, operation mode and the like and start button to direct a start of operation. For example, in the present embodiment, a user can select a normal image forming mode or proof mode (a mode to print a test sheet) as an output mode from the image forming member 5, by operating the operation member 2. The operation member 2 outputs an operation signal inputted by a user to the after-mentioned CPU 11.

The display 3 includes, for example, a LCD (liquid crystal display), CRT (cathode ray tube), display or the like. The display 3 displays on its screen various operation screen such as a setting screen to set conditions, status of an image, operation status of various functions and various processing results or the like, according to a direction of a display signal inputted from the after-mentioned CPU 11. In the present embodiment, the display 3 can display, for example, a stamp selection screen 31 (FIG. 2) to designate a format of a stamp as an additional image (hereinafter referred to as "stamp format"), stamp position setting screen 32 (FIG. 3) to designate an area to which the stamp is to be overlapped (hereinafter referred to as "stamp position"), fine adjustment setting screen 33 (FIG. 5) to adjust stamp position finely, and the like.

The display 3 may be a touch screen in which a pressure-sensitive type (resistive membrane type) touch panel (not illustrated) where translucent terminals are arranged in a reticular pattern is formed on a screen of the display 3 so that the display 3 and operation member 2 are constituted integrally. The touch panel is to detect X-Y coordinate of a power point caused by pushing with a finger, touch pen or the like as voltage level and to output the detected position signal to the CPU 11 as an operation signal. In this case, the display 3 also functions as a setting member together with the operation member 2. In the following description of the present embodiment, the image processing apparatus 1 is exemplified, which comprises a touch screen where the display 3 and operation member 2 are constituted integrally.

Figure 2:
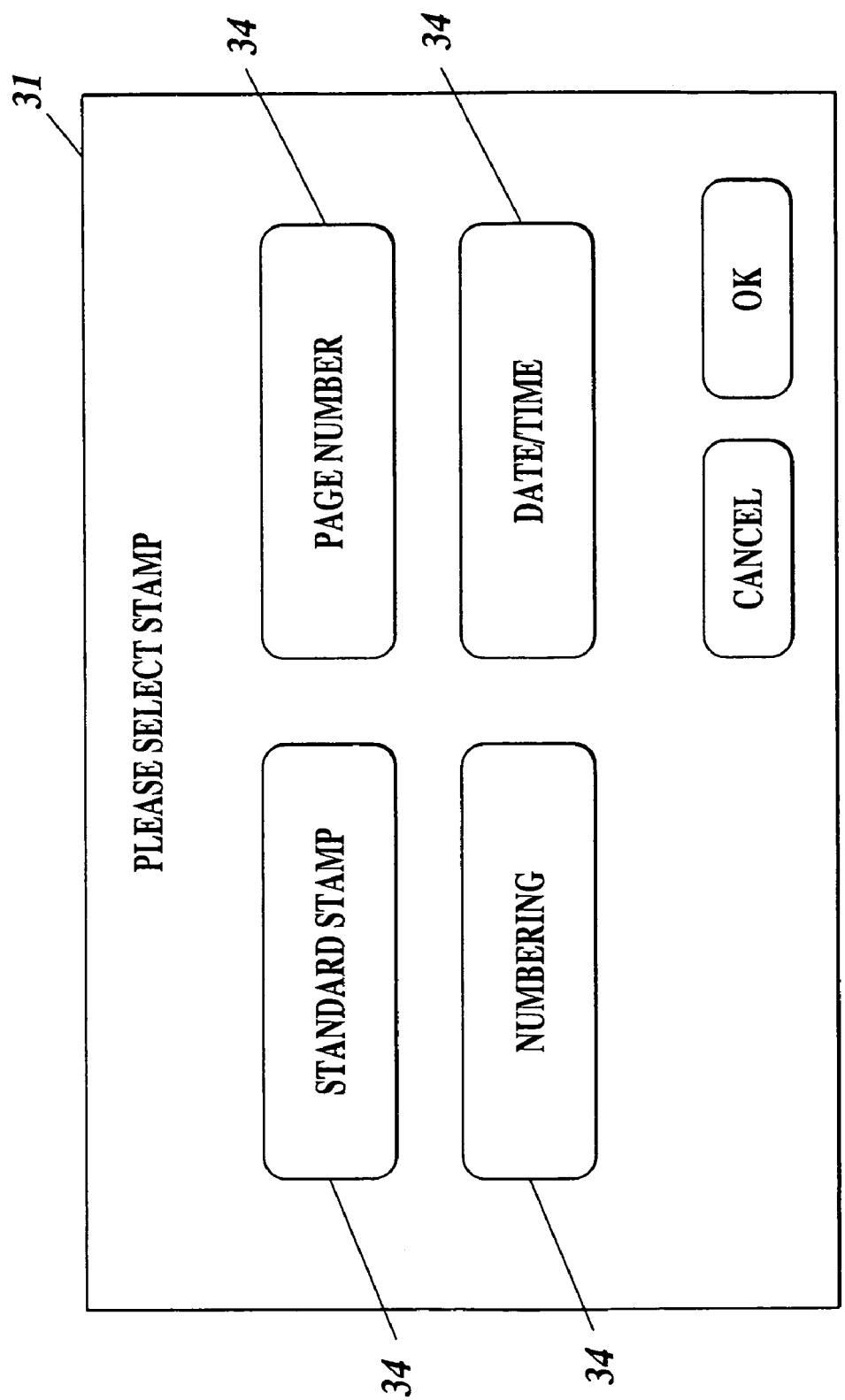
FIG. 2 shows one example of a stamp selection screen.

For example, stamps such as a standard stamp, page number, numbering, date/time are selectable as the additional image in the present embodiment. When the stamp selection screen 31 is displayed on the display 3 by user's operation, setting buttons 34 to select a stamp format of standard stamp, page number, numbering, date/time or the like is displayed on the display 3 as shown in FIG. 2, and a user can select a desired stamp format by pushing down the setting button 34 thereof.

Here, the "standard stamp" is a function to set a previously prepared fixed letter as the stamp, the "page number" is a function to set page number as the stamp, the "numbering" is a function to set numbers as the stamp in the order of original images, and the "date/time" is a function to set date or time when an original is read as the stamp. Among these stamps, the numbering is available as a serial number of a evidence rendered in discovery procedure in the U.S. court. Therefore, especially regarding the numbering, it is highly necessary to add the stamp in a procedure from reading an image to storing the read image data to an after-mentioned compressed memory area 17a which is a memory for storage storing the data as image data accessible from outward or reusable, in order to ensure genuiness of the read image. Also regarding the date/time, it is highly necessary to add the stamp in the procedure similarly before storing the image to the compressed memory area 17a as image data, in order to prove that the image was present at the time of reading.

Figure 3:
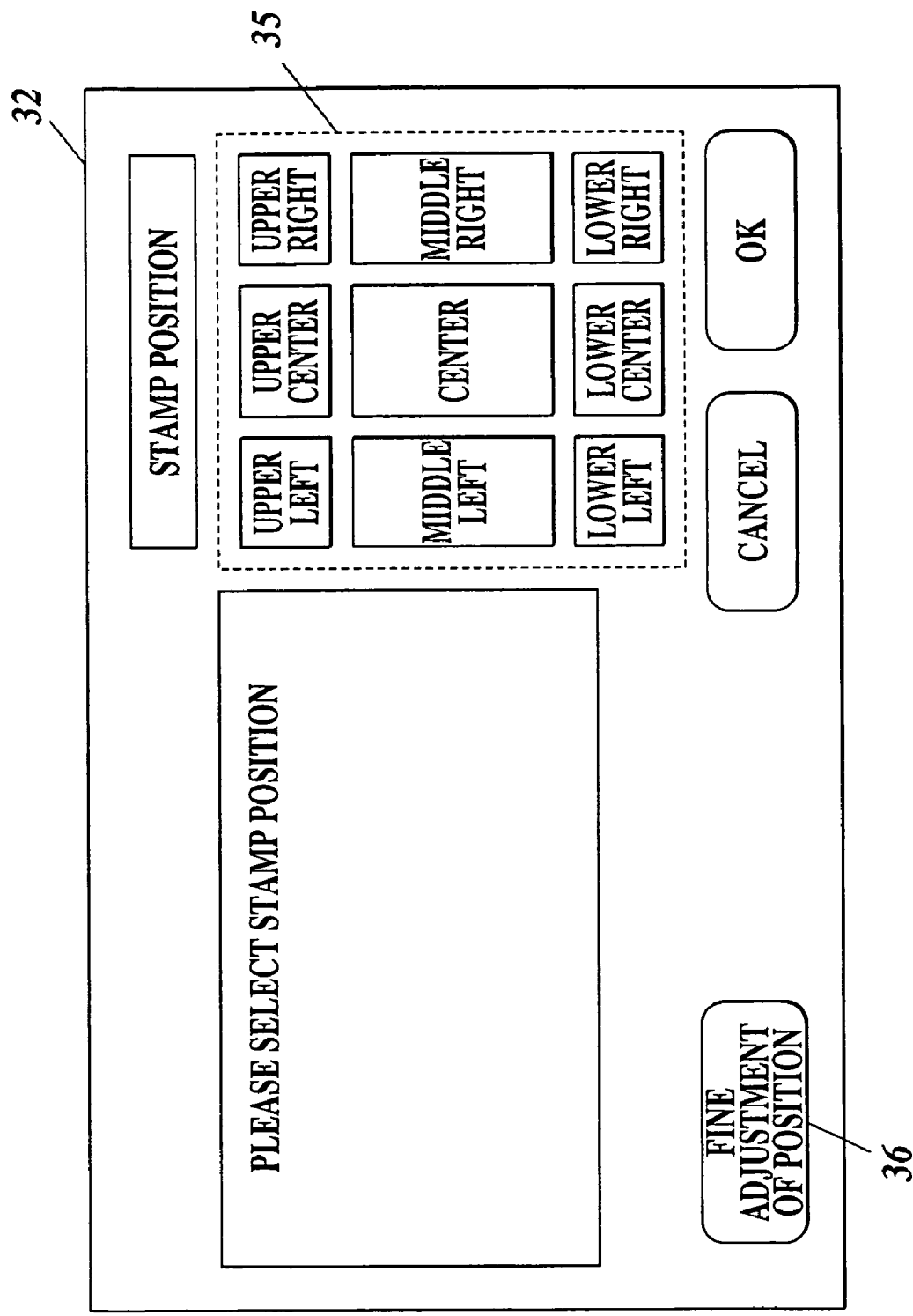
FIG. 3 shows one example of a stamp position setting screen.
Figure 4:
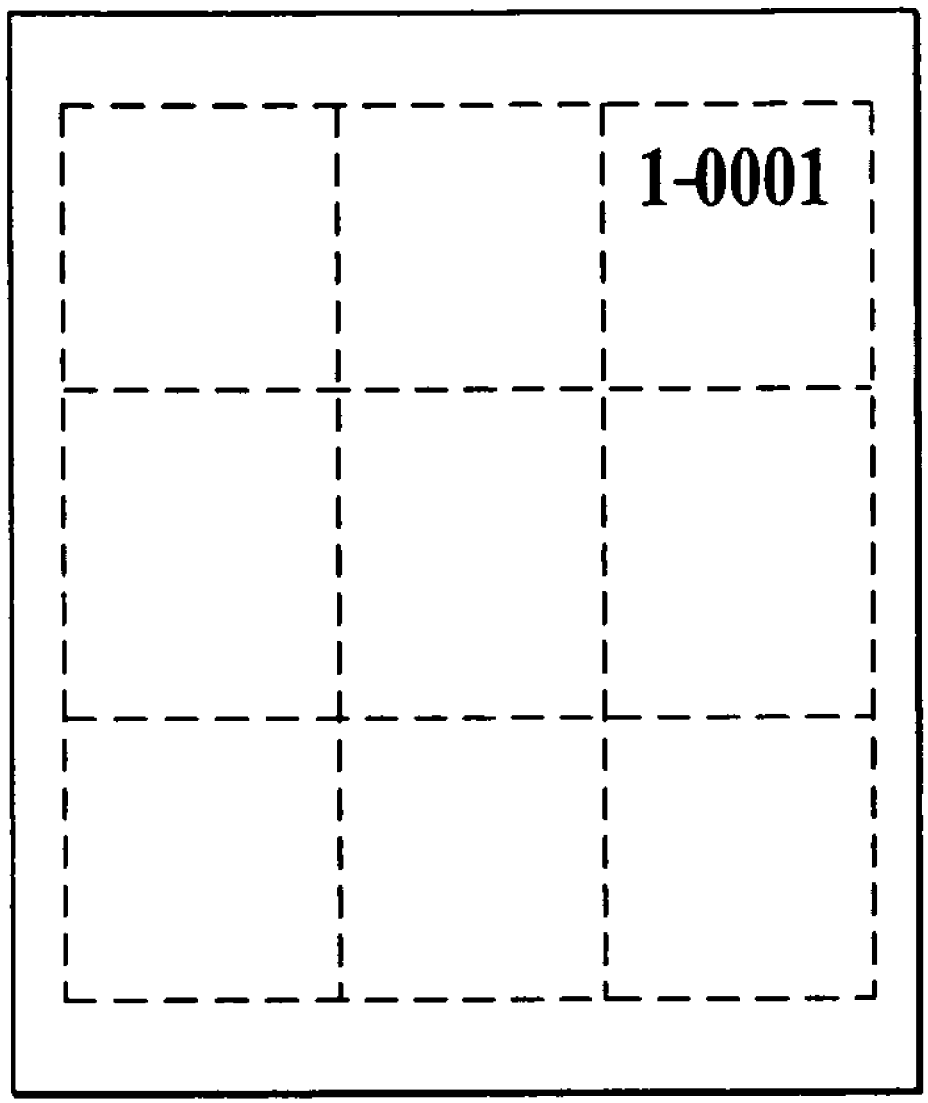
FIG. 4 shows an example of overlapping a stamp in the case of selecting to overlap the stamp at upper right area of an original image.

Next, in the stamp position setting screen 32, for example, a stamp position designating button 35 are displayed on the display 3 as shown in FIG. 3. When a user selects a desired stamp position and pushes down one of the stamp position designating buttons 35, a stamp position is designated from 9 positions of "upper left", "middle left", "lower left", "upper center", "center", "lower center", "upper right", "middle right" and "lower right". For example, when a user designates "upper right" as the stamp position, the stamp is overlapped at upper right area of an original image as shown in FIG. 4.

Figure 5:
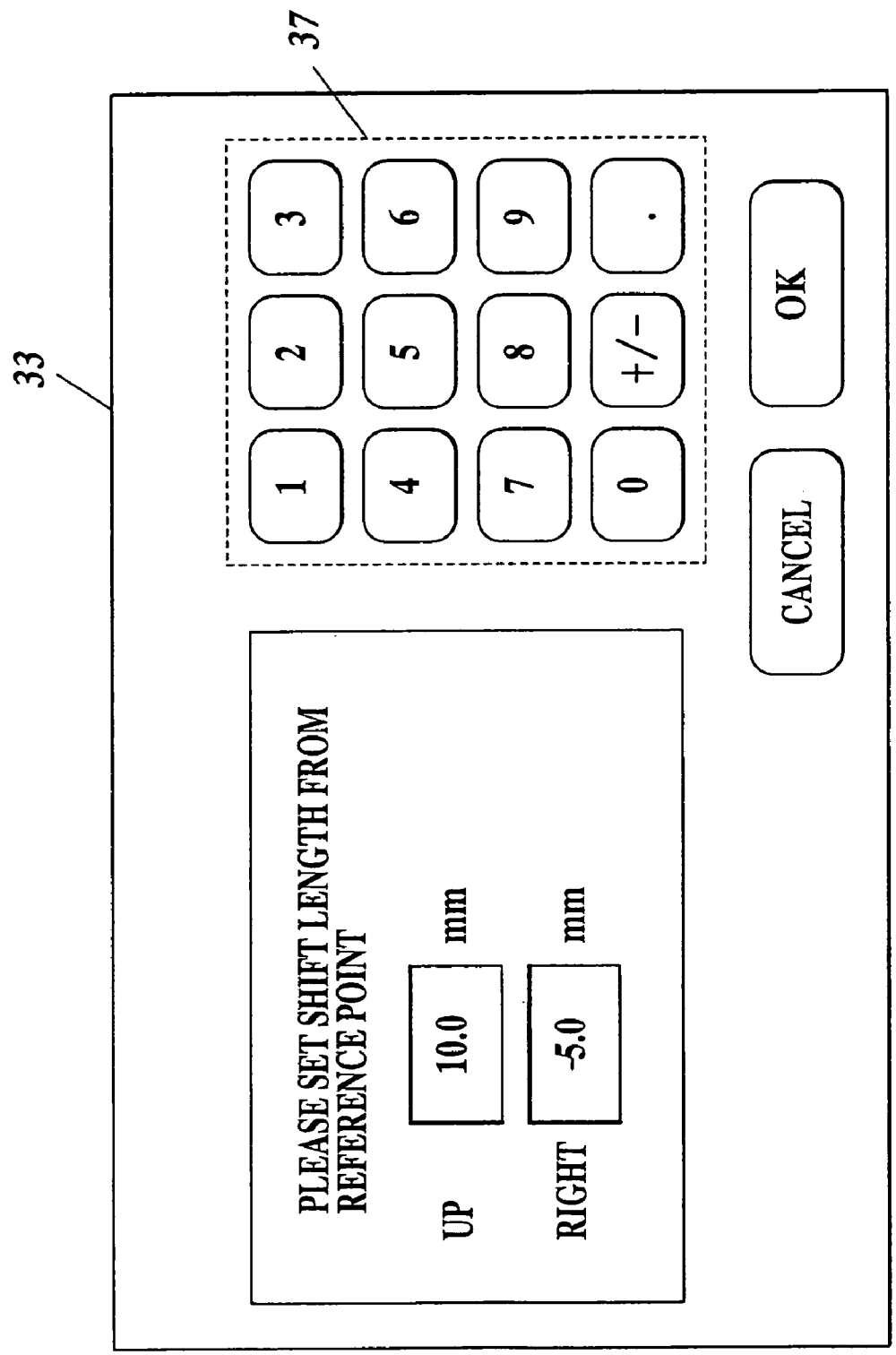
FIG. 5 shows one example of a fine adjustment setting screen.

In the stamp position setting screen 32, when a user pushes down a fine adjustment button 36 to adjust the stamp position finely, a fine adjustment setting screen 33 is displayed on the display 3 as shown in FIG. 5. A user can shift the position of the stamp in longitudinal direction and lateral direction in a unit of 0.1 mm by pushing down numeral keys 37 on the screen, so that the fine adjustment can be performed.

Next, the image reading member 4 is to read an image recorded in an original, and to form a black and white (binary or multilevel including an intermediate value between black and white) image data (original image data). The image reading member 4 comprises a light source to irradiate light to an original, image sensor using CCD (charge coupled device), CMOS (complementary metal-oxide semiconductor) or the like to perform photoelectric conversion on reflected light from the original, scanning section to move the light irradiating the original, and image processing section to perform various conversion/processing to an electric signal read by the image sensor so as to output image data (original image data), all of which are not illustrated. The image reading member 4 reads an image according to a designation signal from the CPU 11.

The image forming section 5 is a printer of, for example, inkjet type, laser type, thermal transfer type, dot impact type or the like, and forms and records an image on a recording medium such as a recording paper based on the image data acquired by the image reading member 4 or the like according to a designation signal from the CPU 11.

Next, the status management member 10 is a computer comprising the CPU 11, a program memory 12, a RAM (random access memory) 13, a memory control IC 15, a compression/decompression IC 16, an image memory 17 and the like.

The program memory 12 is composed of, for example, a non-volatile memory such as a semiconductor, and stores a system program of the image processing apparatus 1, various processing programs such as various application programs executable on the system program, data relating to the processing of these programs, and the like. The program is stored in the form of program code readable by a computer. The CPU 11 executes an operation according to the program code. In the present embodiment, the program memory 12 stores the merged image data forming program which merges a stamp to the image data (original image data) obtained by the image reading member 4, the stamp being as a unique additional image data to be added to each page of the image data, so as to form merged image data in a page basis.

The RAM 13 works as a temporal storage area of the program read from the program memory 12, input or output data, parameter, and the like in the various processings executed and controlled by the CPU 11.

The CPU 11 controls each of the members in the image processing apparatus 1 wholly. The CPU 11 reads a designated program from the system program and various application programs stored in the program memory 12, expands it to the RAM 13, and performs various processings in cooperation with the program expanded to the RAM 13.

The memory control IC 15 controls the compression/decompression IC 16 to compress the image data (original image data) inputted from the image reading member 4 and the merged image data, and writes down the compressed image data (original image data) and merged image data to the compressed memory area 17a of the image memory 17 to store the data therein. Further, in response to a designation to output image data from the CPU 11, the memory control IC 15 controls the compression/decompression IC 16 to decompress the image data (original image data) and merged image data designated to be outputted, which are stored in the compressed memory area 17a, writes down it to the page memory area 17b to temporary store it, and sequentially outputs the image data (original image data) and merged image data to the image forming member 5 in a page basis.

Further, the memory control IC 15 functions as a memory control member to transfer the merged image data formed on a first merging section and second merging section to the compressed memory area 17a which is an optional memory for storage. The merged image data formed on the first merging section and second merging section is one where the original image data and additional image data are corresponded each other with respect to each page of the image.

As described above, the original image data and additional image data formed in an additional data forming section (the additional data forming section is composed of the CPU 11 and stamp information memory 17c as after-mentioned) is stored to the compressed memory area 17a of a memory for storage with the correspondence thereof in each page of the image. Thus, after the original image data and additional image data are merged together, it is possible to ensure uniqueness of the image even in outputting the image from the image forming member 5 or transferring the data outward.

Further, also in the case where the additional image data is overlapped to the original image data by a user adjusting the position so as to form the merged image data having a desired layout after the original image data is once stored to the compressed memory area 17a, the original image data and additional image data are stored to the compressed memory area 17a with the correspondence thereof in each page of the image data. Thus, after the original image data and additional image data are merged together, it is possible to ensure uniqueness of the image even in outputting the image from the image forming member 5 or transferring the data outward.

The compression/decompression IC 16 is an IC to compress and decompress the image data (original image data) and merged image data according to a control of the memory control IC 15.

The image memory 17 is composed of, for example, a DRAM (dynamic random access memory), and comprises a compressed memory area 17a, page memory area 17b and stamp information memory 17c.

The compressed memory area 17a is to store image data compressed in the compression/decompression IC 16 according to a control of the memory control IC 15. In the present embodiment, the compressed memory area 17a functions as a memory for storage to store the original image data and merged image data in which the additional image data has been merged to the original image data. The merged image data is stored in the compressed memory area 17a in the condition that the original image data corresponds to the additional image data in a page basis of the image. The page memory area 17b is to store image data decompressed by the compression/decompression IC 16 in a page basis.

The stamp information memory 17c is a memory to store information of various stamps which is to be added to the original image data as the additional image data in the present embodiment. As for the format of the stamp, standard stamp, page number, numbering, date/time and the like can be given as described above. However, the stamp format is not limited to these examples. For example, a company name, URL or the like designated by a user may be selectable as the stamp.

The stamp information memory 17c stores information such as standard stamp to be added in the case that a predetermined image is added as character data. When the standard stamp or the like is added to the original image data, the CPU 11 reads this character data from the stamp information memory 17c together with the font data thereof, forms stamp image data as the additional image data, and adds it to the original image data. On the other hand, when a character image varies such in the case of the date/time, page number and numbering, basic character data to be added is stored to the stamp information memory 17c. The CPU 11 calculates this character data, forms the stamp image data as the additional image data from the font data based on the calculation result, and adds this stamp image data to the original image data. In particular, in the case of the page number and numbering, the number to be added changes in each page. Thus, the stamp information memory 17c is preferably provided with a counter to count the number to be added to each original image data. When the number to be added to each original image data is determined by providing a counter, the number of the counter may be reset in a predetermined interval such as every image forming job, or may count the number continuously over jobs.

In the present embodiment, the CPU 11 controls the memory control IC 15 and image memory 17 in cooperation with the merged image data forming program expanded to the RAM 13, so that the CPU 11, memory control IC 15 and image memory 17 constitute the first merging section and second merging section to merge the additional image data into the original image data. The first merging member and second merging member are simply referred to as a merging section as a whole.

That is, in the present embodiment, the CPU 11 reads data of a stamp image from the stamp information memory 17c, and forms the stamp image data as the additional image data. The CPU 11 and stamp information-memory 17c constitute the additional data forming section. Before the memory control IC 15 stores the original image data obtained from the image reading member 4 to the compressed memory area 17a of a memory for storage, the CPU 11 adds the stamp image data of the additional image data to the original image data so as to form the merged image data. The CPU 11 and memory control IC 15 constitute the first merging section.

The CPU 11 merges the stamp image data of the unique additional image data to the original image data which has once stored in the compressed memory area 17a by the memory control IC 15, so as to form the merged image data in a page basis. The CPU 11 and memory control IC 15 constitute the second merging section. Specifically, in the case where it is selected on the operation member 2 that an image is formed in a proof mode (a mode to print a test sheet), the second merging section forms the merged image data when the stamp image data is merged to the original image data while the image forming member 5 forms an image in the proof mode.

The CPU 11 functions as a controller to select whether the first merging section or second merging section merges the original image data and additional image data. According to the control of the CPU 11, the first merging section or second merging section works selectively. In other words, the CPU 11 functions as a controller, and selectively makes the merging section work as the first merging section or second merging section.

When the first merging section merges the original image data and additional image data (a first mode), the additional image data is overlapped to the original image data before the original image data is stored in the compressed memory area 17a of a memory for storage. Thus, since the read image is sure to be overlapped with the unique additional image data, it is possible to ensure uniqueness of an image.

When the second merging section merges the original image data and additional image data (a second mode), the unique additional image data is overlapped to the original image data after the original image data is once stored in the compressed memory area 17a. Accordingly, when an image is formed in a mode to print a test sheet after the original image data is once stored in the compressed memory area 17a (proof mode) for example, a user can overlap the additional image data while adjusting the position thereof. Thus, it is possible to form the merged image data having a desired layout in which the additional image data is overlapped at a position desired by the user, and to output the merged image data from the image forming member 5, while uniqueness of the image is ensured.

The CPU 11 can select to perform the merge whether in the first mode or in the second mode. Thus, the present embodiment can be adapted to various purposes.

The merging process of the original image data and additional image data of the present embodiment is described with reference to FIG. 6. It is noted that FIG. 6 is a view which conceptually represents a section to perform the merging process, and thus does not represent an actual apparatus or operation.

Figure 6:
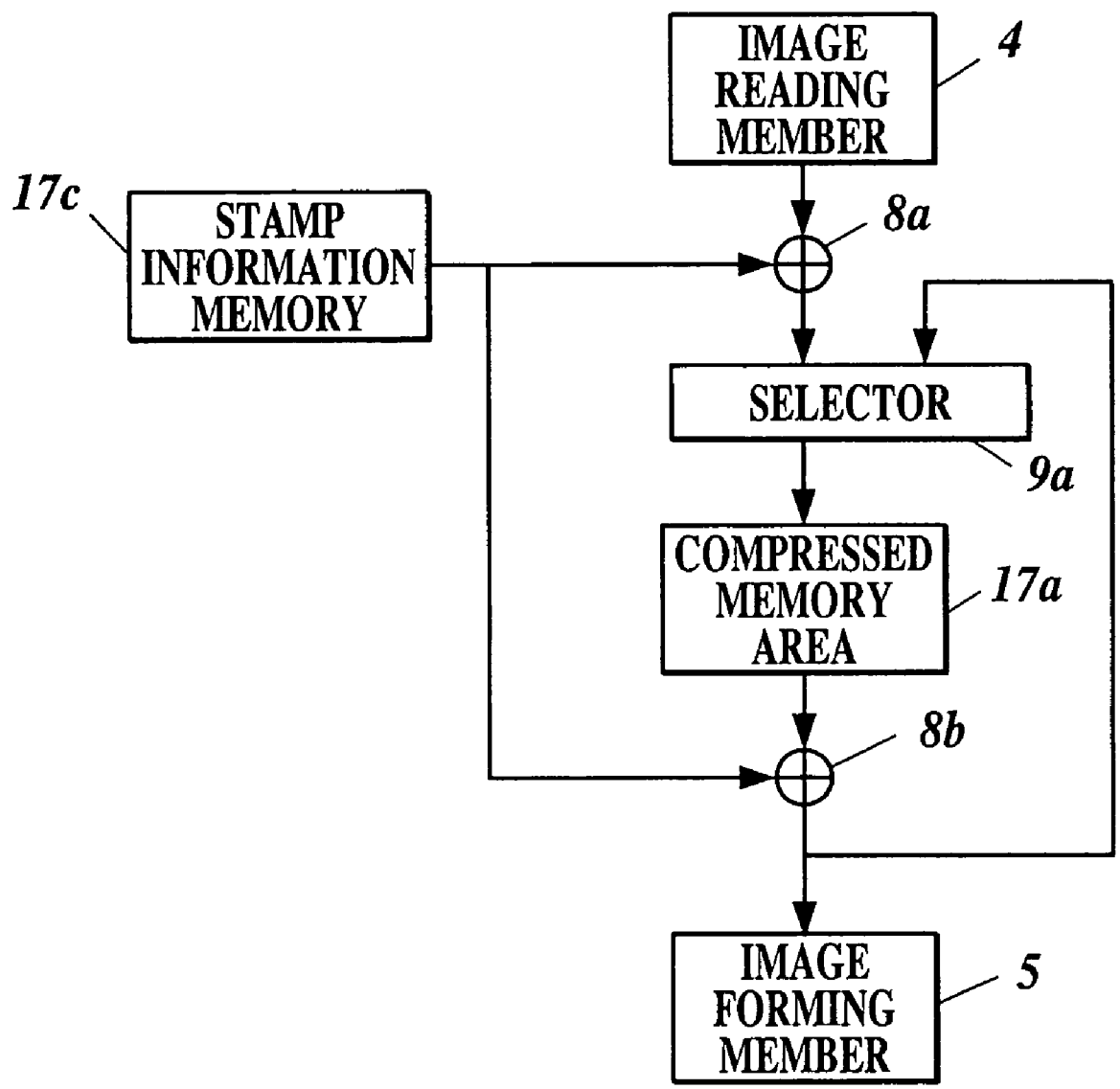
FIG. 6 is a conceptual diagram explaining a merged image data forming process of the first embodiment.

As shown in FIG. 6, the image processing apparatus 1 of the present embodiment comprises two merging sections 8a and 8b to merge original image data with additional image data. When the original image data outputted from the image reading member 4 is merged with the additional image data formed from information stored in the stamp information memory 17c, the original image data is merged with the stamp image data at the merging section 8a so that the merged image data is formed, and the merged image data is sent and stored to the compressed memory area 17a of a memory for storage through a selector 9a.

Accordingly, the merging section 8a of the first merging section overlaps the additional image data to the original image data before the original image data is stored to the compressed memory area 17a of a memory for storage. Thus, since the read image is sure to be overlapped with the unique additional image data, uniqueness of the image is ensured.

When the additional image is overlapped to the original image data which has once stored in the compressed memory area 17a, the CPU 11 outputs a control signal so as to switch a path to send the stamp image data formed from information stored in the stamp information memory 17c. The stamp image data is merged with the original image data stored in the compressed memory area 17a at the merging section 8b which locates at latter stage than the compressed memory area 17a, so that the merged image data is formed.

Accordingly, the merging section 8b of the second merging section merges the original image data with the unique additional image data, after the original image data is once stored in the compressed memory area 17a of a memory for storage. Thus, since a user can overlap the additional image data while adjusting the position thereof after the original image data is once stored in the compressed image memory 17a, it is possible to form the merged image data having a desired layout and to output it from the image forming member 5.

When the image is outputted to a recording paper or the like, this merged image data is outputted to the image forming member 5 and the image is recorded. When the merged image data is stored to the compressed memory area 17a of a memory for storage, the CPU 11 outputs a control signal so as to switch a path to send the merged image data. Accordingly, the merged image data is sent and stored to the compressed memory area 17a through the selector 9a In this case, the merged image data which has been previously stored in the merging section 8a is discarded.

Figure 7:
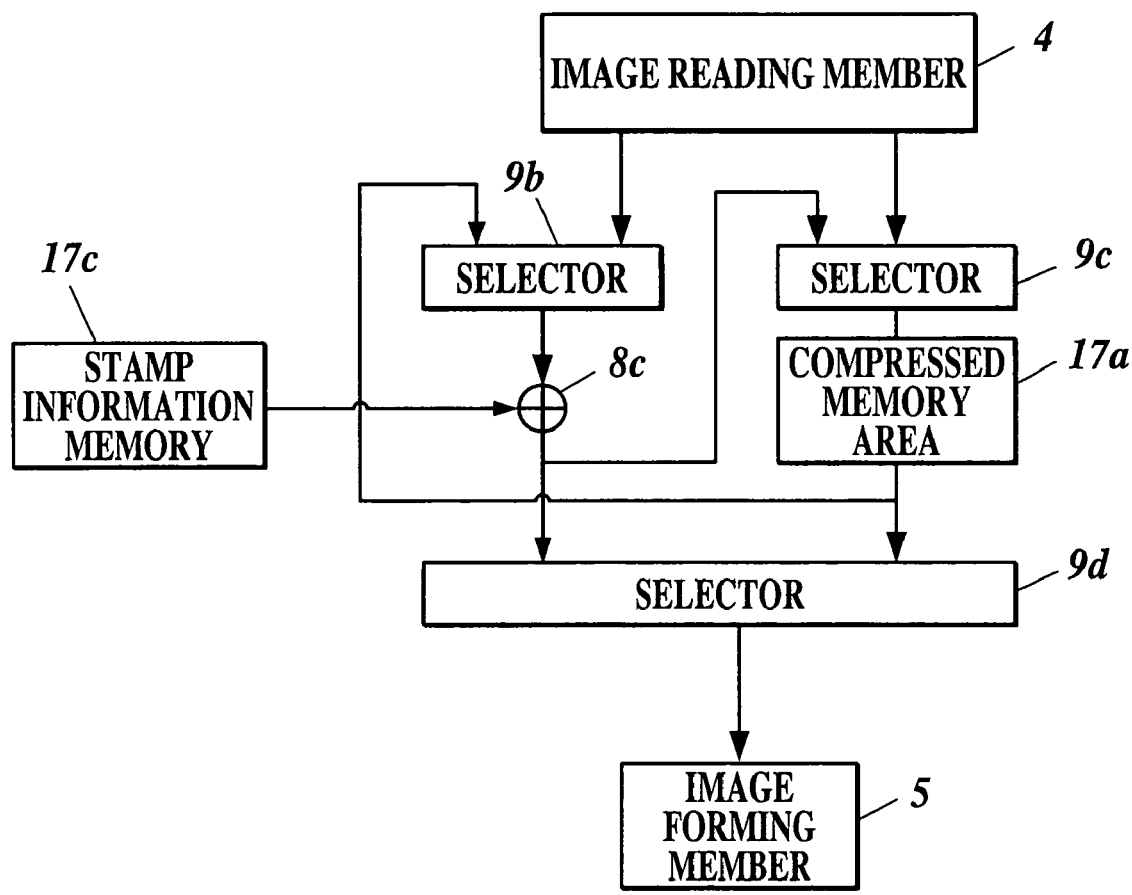
FIG. 7 is a conceptual diagram explaining a merged image data forming process of a variation of the first embodiment.

The number of the merging section 8 to merge the original image data and additional image data is not limited to two. For example, as shown in FIG. 7, an embodiment comprises one merging section 8c, in which a CPU 11 switches a path to send the original image data and additional image data by a control signal so that it makes possible to perform a merging process at both of stages former and latter than the compressed memory area 17a. That is, when the original image data is merged to the stamp image data of the additional image data before the original image data is stored to the compressed memory area 17a of a memory for storage, the original image data outputted from the image reading member 4 is sent to the merging section 8c through the selector 9b and is merged to the stamp image data, so that the merged image data is formed. The merged image data is sent and stored to the compressed memory area 17a through the selector 9c.

When the original image data is merged to the additional image data after the original image data is once stored in the compressed memory area 17a, the original image data stored in the compressed memory area 17a is sent to the merging section 8c through the selector 9b and the merging section 8c merges this original image data to the stamp image data, so that the merged image data is formed.

When the image is output to a recording paper or the like, this merged image data is outputted to the image forming member 5 through the selector 9d, so that the image is recorded. When the merged image data is stored to the compressed memory area 17a of a memory for storage, the CPU 11 switches a path to send the merged image data by a control signal. Accordingly, the merged image data is sent and stored to the compressed memory area 17a through the selector 9c. In this case, the merged image data which has been previously merged at merging section 8c and stored in the compressed memory area 17a is discarded.

Next, an image processing method in the image processing apparatus of the present embodiment is described specifically with reference to FIGS. 8 to 13. A cooperation of a computer composed of the CPU 11 or the like and the above-described merged image data forming program makes the following merged image data forming process.

The merged image data forming process starts when a user selects the merged image data forming process on a touch panel and the like of the operation member 2. When the merged image data forming process is performed, a user selects a format and position to overlap of the stamp to be merged to the original image data, for example as described above, on the stamp selection screen 31 (see FIG. 2), stamp position setting screen 32 (see FIG. 3) or the like of the display 3 which also works as the operation member 2.

Figure 8:
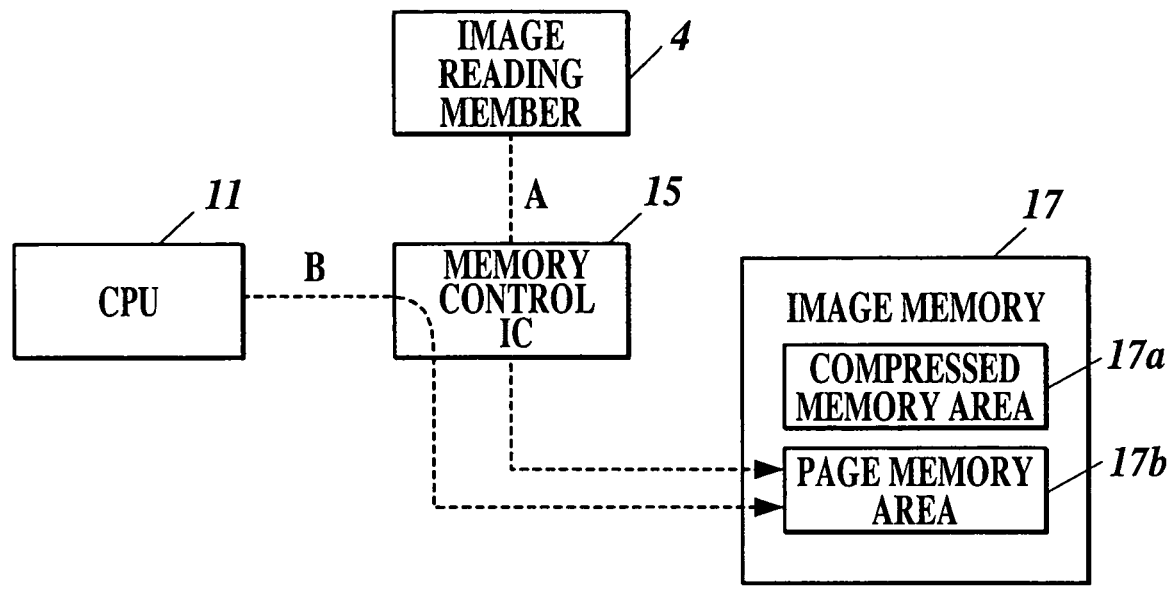
FIG. 8 shows a procedure of the merged image data forming process in an image processing apparatus of the first embodiment.

As shown in FIG. 8, the original image data obtained by the image reading member 4 is stored to the page memory area 17b of the image memory 17 through the memory control IC 15 (arrowed dash line (1) in FIG. 8). The CPU 11, memory control IC 15 or the like, which function as the first-merging section, read a stamp of the type selected on the control member 2 from the stamp information memory 17c, and form the stamp image data of the additional image data. Subsequently, a merging process to overlap the stamp image data to the original image-data stored in the page memory area 17b at the position selected on the operation member 2 is performed, so that the merged image data is formed (arrowed dash line (2) in FIG. 8).

Figure 9:
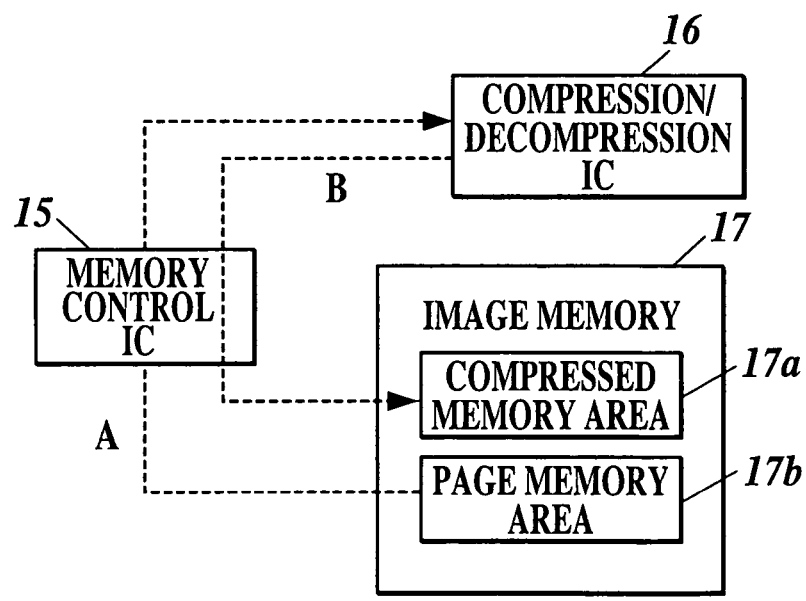
FIG. 9 shows a procedure of the merged image data forming process in an image processing apparatus of the first embodiment.

As shown in FIG. 9, the merged image data in which the stamp image data is merged to the original image data is sent to the compression/decompression IC 16 through the memory control IC 15, and a compression process is performed according to a control of the memory control IC 15 (arrowed dash line (1) in FIG. 9). The compressed merged image data is stored to the compressed memory area 17a of a memory for storage through the memory control IC 15 (arrowed dash line (2) in FIG. 9).

Figure 10:
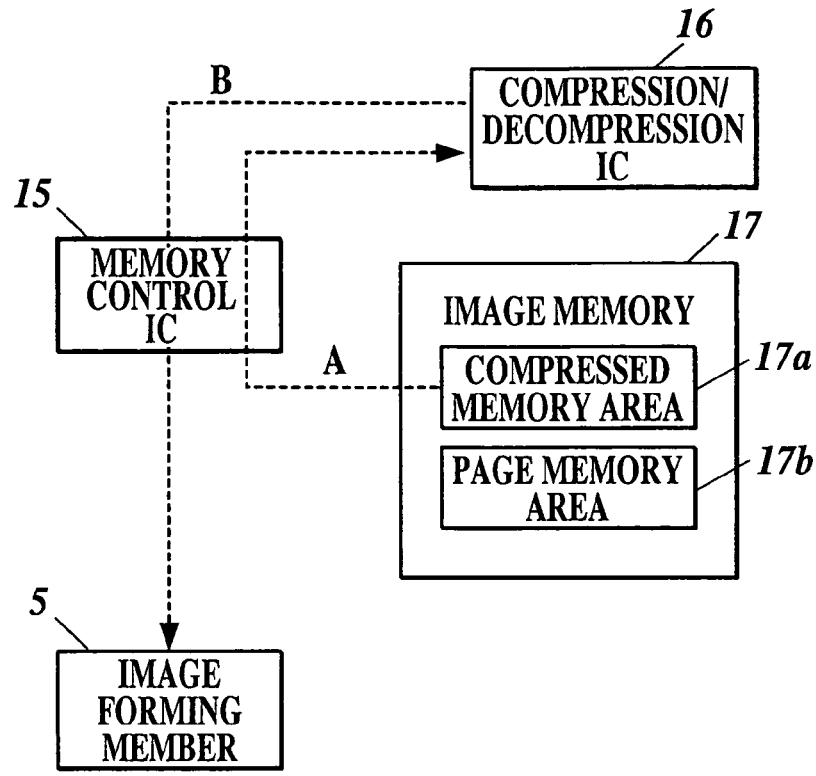
FIG. 10 shows a procedure of the merged image data forming process in an image processing apparatus of the first embodiment.

In the case where a normal image forming is selected on the operation member 2 and an image is outputted, as shown in FIG. 10, the stamp image data is overlapped (merged) before the original image data is stored to the compressed memory area 17a of a memory for storage. The merged image data stored in the compressed memory area 17a is sent to the compression/decompression IC 16 through the memory control IC 15, and a decompression process is performed according to a control of the memory control IC 15 (arrowed dash line (1) in FIG. 10). The decompressed merged image data is outputted to the image forming member 5 page by page through the memory control IC 15, and the image is formed sequentially. In this case, the image may be formed in a manner that the merged image data is outputted to the image forming member 5 page by page after the merged image data is once stored to the page memory area 17b through the memory control IC 15.

Figure 11:
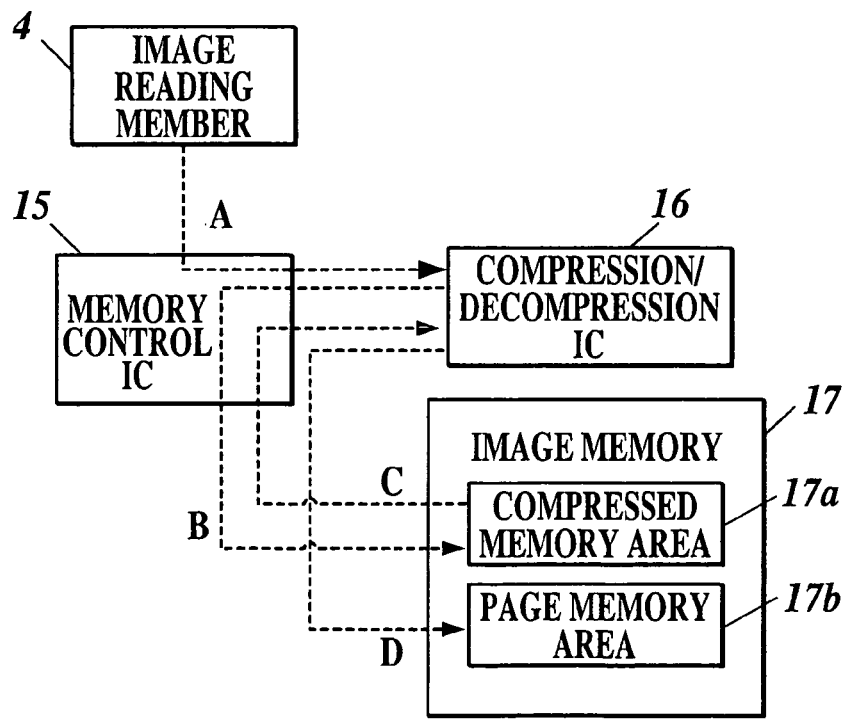
FIG. 11 shows a procedure of the merged image data forming process in an image processing apparatus of the first embodiment.

On the other hand, in the case where the image forming member 5 forms an image of the original image data already stored in the compressed memory area 17a in a proof mode while the stamp image data is merged to the original image data, the process is executed as follows. That is, as shown in FIG. 11, the original image data obtained by the image reading member 4 is sent to the compression/decompression IC 16 through the memory control IC 15, and the original image data is compressed according to a control of the memory control IC 15 (arrowed dash line (1) in FIG. 11). The compressed original image data is stored to the compressed memory area 17a of a memory for storage through the memory control IC 15 (arrowed dash line (2) in FIG. 11). Thereafter, when it is selected on the operation member 2 that the image is formed in a proof mode, the original image data stored in the compressed memory area 17a is sent to the compression/decompression IC 16 through the memory control IC 15, and the original image data is decompressed according to a control of the memory control IC 15 (arrowed dash line (3) in FIG. 11). The decompressed original image data is stored to the page memory area 17b through the memory control IC 15 (arrowed dash line (4) in FIG. 11).

Figure 12:
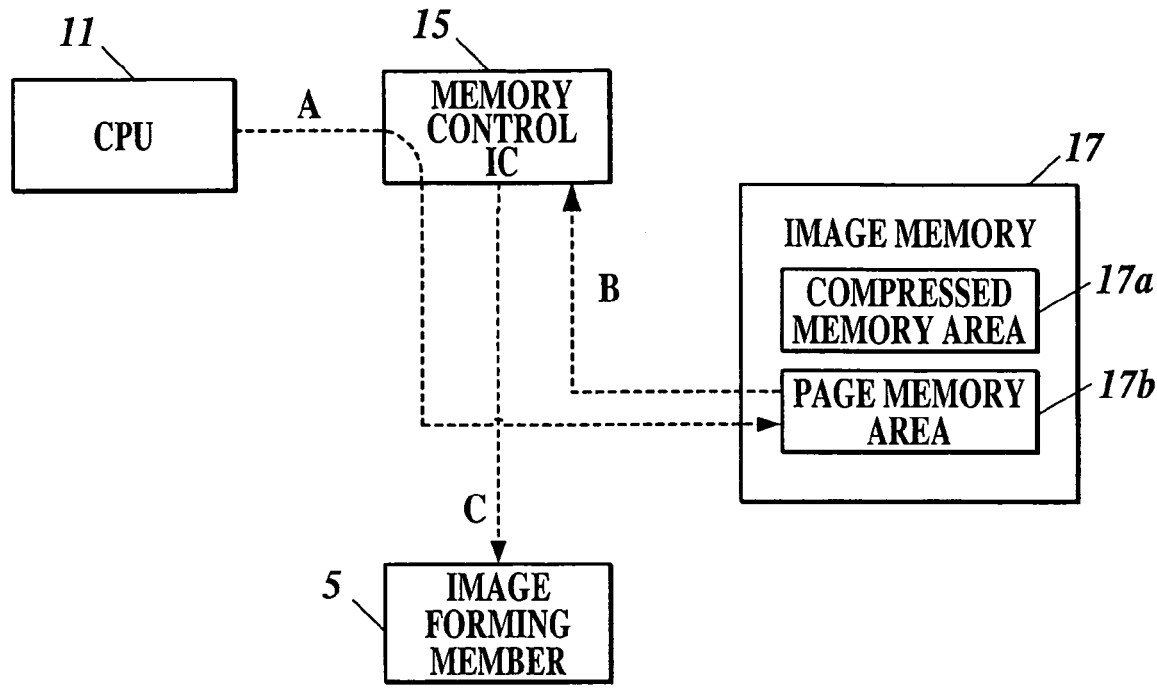
FIG. 12 shows a procedure of the merged image data forming process in an image processing apparatus of the first embodiment.

Subsequently, the CPU 11, memory control IC and the like, which function as the second merging section, perform a merging process to merge the stamp image data of the selected type at the selected position to the original image data which was once stored in the compressed memory area 17a of a memory for storage and sent to the page memory area 17b, so that the merged image data to which the stamp data has been merged is formed (arrowed dash line (1) in FIG. 12). That is, a user checks the image on a recording paper outputted and recorded by the image forming member 5, and when a user wishes to adjust the stamp position, a user selects a position to overlap the stamp, for example, on the stamp position setting screen 32 (see FIG. 3), fine adjustment setting screen 33 (see FIG. 5) or the like of the display 3 which also works as the operation member 2. When the stamp position is selected, the CPU 11 overlaps the stamp image data to the original image data in the selected condition, so that the merged image data is formed. When the formed merged image data is outputted from the image forming member 5, the formed merged image data is outputted to the image forming member 5 through the memory control IC 15 (arrowed dash line (2) in FIG. 12), so that the image is formed (arrowed dash line (3) in FIG. 12). By repeating the process shown in FIG. 12, a user can adjust the stamp position to be a desirable position for the user. When it is desired to adjust the stamp position after the stamp is once overlapped, the original image data is read again and the stamp image data is overlapped thereto. When a new merged image data is formed by doing so, the previously formed merged image data is discarded.

Figure 13:
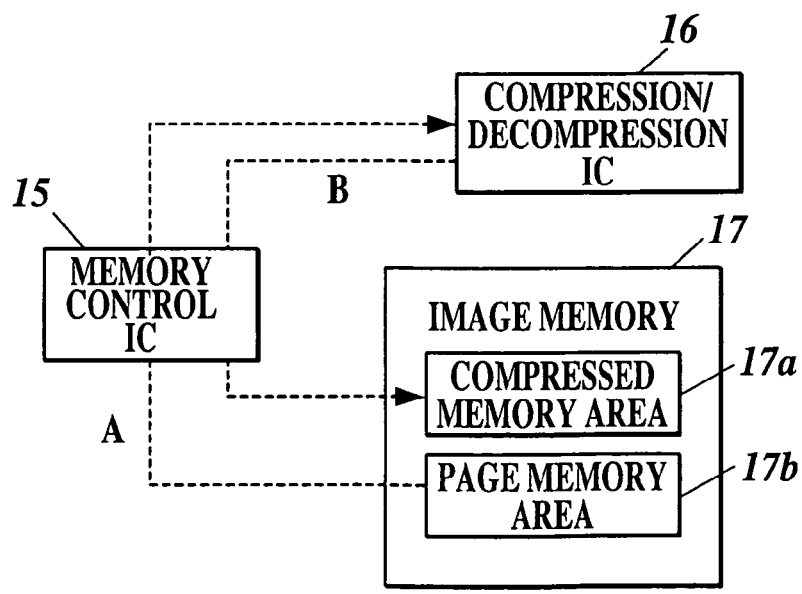
FIG. 13 shows a procedure of the merged image data forming process in an image processing apparatus of the first embodiment.

When the stamp position is adjusted and the merged image data where the stamp is overlapped at a position desired by a user is formed, the merged image data stored in the page memory area 17b is sent to the compression/decompression IC 16 through the memory control IC 15, and the merged image data is compressed according to a control of the memory control IC 15 (arrowed dash line (1) in FIG. 13). The compressed merged image data is stored to the compressed memory area 17a of a memory for storage through the memory control IC 15 (arrowed dash line (2) in FIG. 13).

As described above, according to the present embodiment, the stamp image data of the additional image data is merged (overlapped) to the original image data obtained in the image reading member 4, before the original image data is stored to the compressed memory area 17a. Thus, since the read image is sure to be overlapped with the unique additional image data, uniqueness of the image is ensured.

Further, even after the original image data is once stored in the compressed memory area 17a, it is possible to overlap in the image forming of proof mode. Thus, it is possible to obtain an image desirable for a user by regulating the stamp position while uniqueness of the image is ensured.

In the present embodiment, the image reading member 4 is exemplified as the image obtaining member. However, the image obtaining member is not limited to the image reading member 4. For example, an embodiment may be provided with a communication means which can communicate with an external device as the image obtaining member, in which an additional image is added to an image data transmitted from the external device.

Further, the present invention is not limited to the above embodiment, and can be modified optionally.

Next, a second embodiment of the image processing apparatus of the invention is described with reference to FIGS. 14 and 15. An image processing apparatus 20 of the present embodiment is same as that of the first embodiment, except a HDD (hard disk drive) 21 is provided as a memory for storage. Thus, the difference from the first embodiment will be particularly described.

Figure 14:
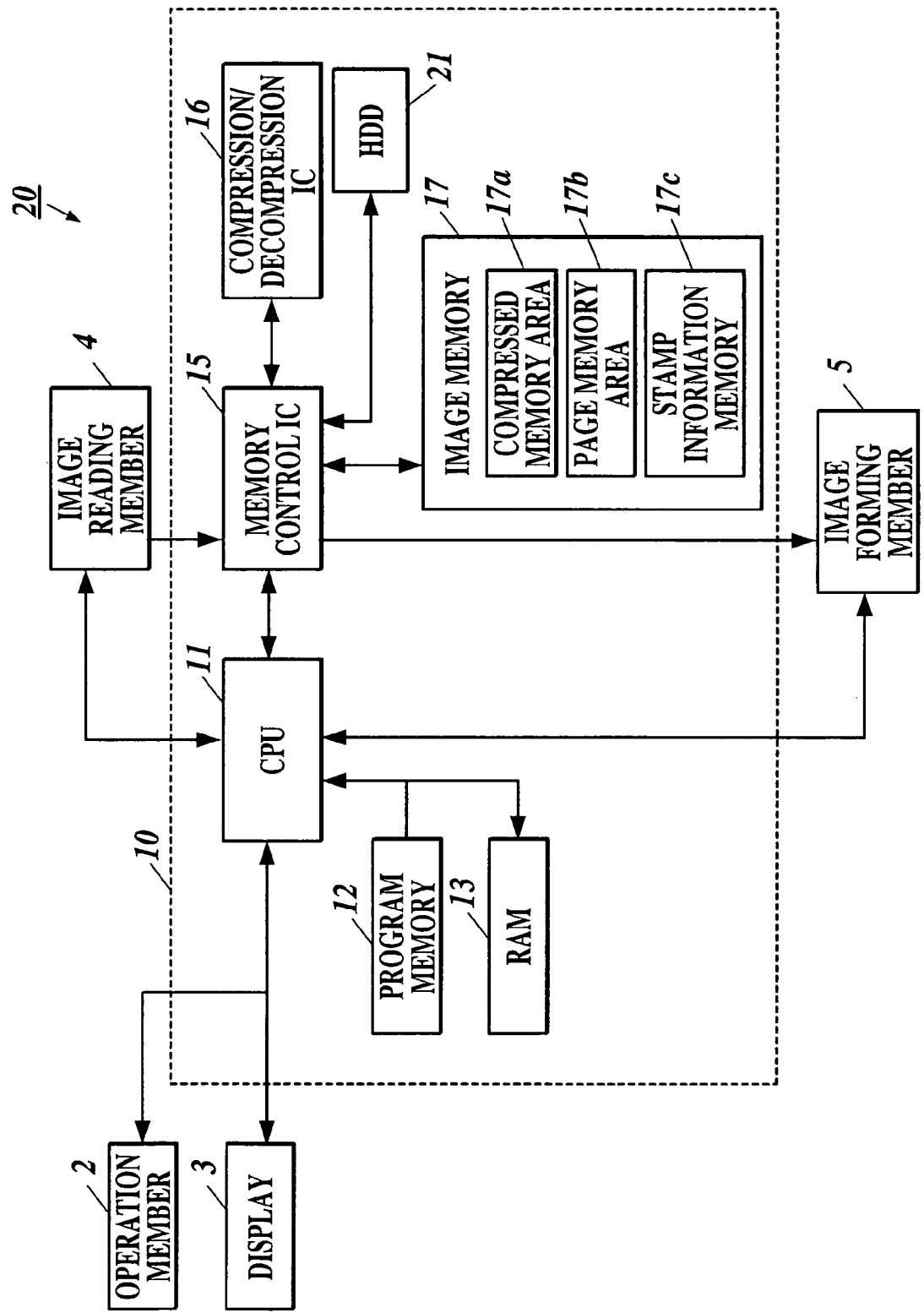
FIG. 14 is a block diagram showing schematic constitution of an image processing apparatus of a second embodiment of the present invention.

The image processing apparatus 20 of the present embodiment comprises an operation member 2, a display 3, an image reading member 4 and an image forming member 5 which are similar with those of the first embodiment, as shown in FIG. 14. Further, the image processing apparatus 20 comprises a status management member 10 to control each member of the apparatus wholly. The status management member 10 comprises an HDD 21 as a memory for storage as well as an image memory 17, and comprises the same constitution as that of the first embodiment except that.

Regarding the other constitution, the same reference numerals are given to the same member as that of the first embodiment, and the description thereof is omitted.

Next, an image forming method of the image processing apparatus 20 of the present embodiment is described specifically. Similar with the first embodiment, a cooperation of a computer composed of a CPU 11 or the like and the above-described merged image data forming program makes the following merged image data forming program.

When the merged image data forming process is performed, firstly, an original image data obtained by the image reading member 4 is stored to a page memory area 17b of an image memory 17 through a memory control IC 15. The CPU 11, memory control IC 15 and the like, which function as a first merging section, read a stamp of the type selected in the operation member 2 from stamp information memory 17c, forms stamp image data as the additional image data, and performs a merging process to merge (overlap) the stamp image data to the original image data stored in the page memory area 17b at the position selected on the operation member 2, so that the merged image data is formed.

Figure 15:
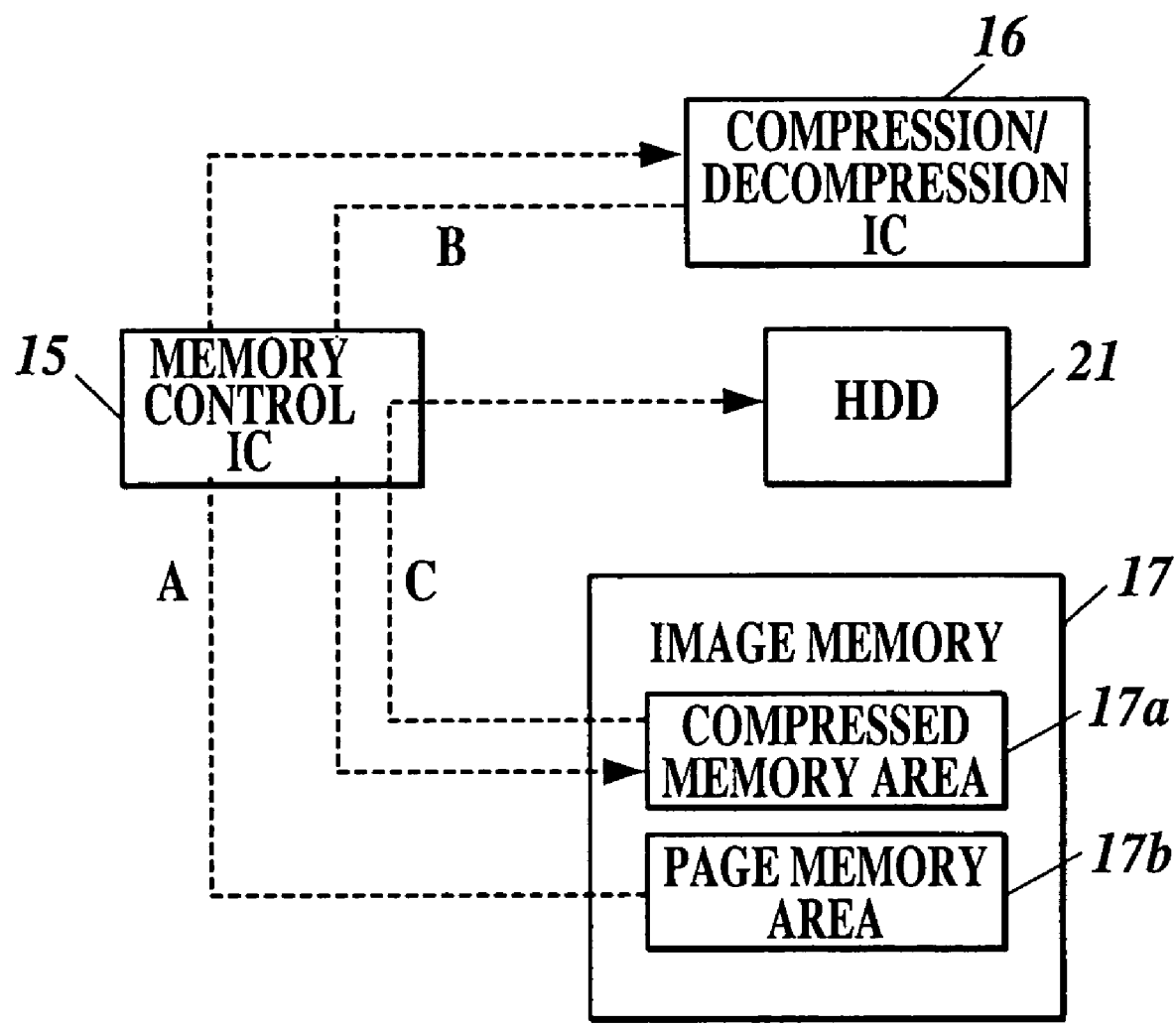
FIG. 15 shows a procedure of an image data merging process in the image processing apparatus of the second embodiment.

As shown in FIG. 15, the merged image data in which the original image data is overlapped with the stamp image data is sent to the compression/decompression IC 16 through the memory control IC 15, and is compressed according to a control of the memory control IC 15 (arrowed dash line (1) in FIG. 15). The compressed merged image data is once stored in the compressed memory area 17a of a buffer through the memory control IC 15 (arrowed dash line (2) in FIG. 15). Subsequently, the merged image data is further sent and stored to the HDD 21 of a memory for storage through the memory control IC 15 (arrowed dash line (3) in FIG. 15).

In the case where normal image forming is selected on the operation member 2 and an image is outputted, the merged image data stored in the HDD 21, to which the stamp image data was overlapped before the original image data is stored to the HDD 21 of a memory for storage is sent to the compression/decompression IC 16 through the memory control IC 15, and the merged image data is decompressed according to a control of the memory control IC 15. The decompressed merged image data is outputted to the image forming member 5 page by page through the memory control IC 15, and the image is formed sequentially. In this case, the image may be formed in a manner that the merged image data is outputted to the image forming member 5 page by page after the merged image data is once stored to the page memory area 17b.

On the other hand, in the case where an image forming in a proof mode is selected on the operation member 2 and a stamp is overlapped to the original image data while the image forming member forms an image in the proof mode, the original image data already stored in the HDD 21 is sent to the compression/decompression IC 16 through the memory control IC 15, and the original image data is decompressed according to a control of the memory control IC 15. The decompressed original image data is stored in the page memory area 17b through the memory control IC 15.

Subsequently, the CPU 11, memory control IC 15 and the like, which function as a second merging section, merge the stamp image data of the selected type is overlapped at the selected position to the original image data which was once stored in the HDD 21 of a memory for storage and sent to the page memory area 17b, so that the merged image data to which the stamp image data has been overlapped is formed. That is, a user checks the image on a recording paper outputted and recorded by the image forming member 5, and when a user wishes to adjust the stamp position, a user selects a position to overlap the stamp, for example, on the stamp position setting screen 32 (see FIG. 3), fine adjustment setting screen 33 (see FIG. 5) or the like of the display 3 which also works as the operation member 2. When the stamp position is selected, the CPU 11 overlaps the stamp image data to the original image data in the selected condition, so that the merged image data is formed. When the formed merged image data is outputted from the image forming member 5, the formed merged image data is outputted to the image forming member 5 through the memory control IC 15, and the image is formed. By repeating this process, a user can adjust the stamp position to be a desirable position for the user. When it is desired to adjust the stamp position after the stamp is once overlapped, the original image data is read again and the stamp image data is overlapped thereto. When a new merged image data is formed by doing so, the previously formed merged image data is discarded.

When the stamp position is adjusted so that the merged image data in which the stamp image data is overlapped at the position desired by a user is formed, the merged image data stored in the page memory area 17b is sent to the compression/decompression IC 16 through the memory control IC 15 and the merged image data is compressed according to a control of the memory control IC 15. The compressed merged image data is stored to the HDD 21 of a memory for storage after the compressed merged image data is once stored to the compressed memory area 17a through the memory control IC 15. In this case, the merged image data previously stored in the HDD 21, which is the merged image data before adjusting the stamp position, is discarded.

As described above, according to the present embodiment, the compressed memory area 17a is used as a buffer. The merged image data in which the original image data and stamp image data are overlapped and compressed is once stored to the compressed memory area 17a of the memory 17, and thereafter, the merged image data is sent to the HDD 21, and is stored and saved in the HDD 21. Thus, a lot of original image data and merged image data can be stored compared to the case where the compressed memory area 17a is a memory for storage.

In the present embodiment, the HDD 21 is installed in the image forming apparatus. However, the HDD may be installed outside the apparatus.

Similar with the case of the first embodiment, the present invention is not limited to the present embodiment.

What is claimed is:

1. An image processing apparatus comprising:
    an image obtaining member which obtains an original image and outputs original image data of the original image,
    a merging member which merges unique additional image data to the original image data so as to form merged image data on a page basis, the unique additional image data being added page by page,
    a position specifying member which specifies a position to which the additional image data is merged,
    a fine adjustment member which finely adjusts the position specified by the position specifying member to which the additional image data is merged,
    a memory which stores the original image data and the merged image data,
    an image forming member which forms an image based on the merged image data formed in the merging member, and
    a controller which executes one of a first mode and a second mode selectively,
    wherein in the first mode, the controller (i) controls the merging member to form the merged image data before the original image data is stored to the memory, (ii) stores the merged image data to the memory, (iii) reads the merged image data stored in the memory, and (iv) controls the image forming member to form an image based on the merged image data,
    wherein in the second mode, the controller (i) reads the original image data from the memory after the original image data is stored to the memory, (ii) controls the merging member to form the merged image data, and (iii) controls the image forming member to form an image based on the merged image data,
    wherein the controller executes the second mode when a proof mode to print a test sheet is specified, and
    wherein when the proof mode to print the test sheet ends, the controller sends and stores the merged image data formed by executing the second mode to the memory for storage.

2. The image processing apparatus of claim 1, further comprising:
    a setting member which enables selection of one of the first mode and the second mode as an output mode from the image forming member,
    wherein the controller executes one of the first mode and the second mode according to a selection on the setting member.

3. An image processing method for an image processing apparatus, the method comprising:
    obtaining an original image and outputting original image data of the original image,
    merging unique additional image data to the original image data so as to form merged image data on a page basis, the unique additional image data being data to be added page by page,
    specifying a position to which the additional image data is merged,
    finely adjusting the specified position to which the additional image data is merged,
    storing at least one of the original image data and the merged image data,
    forming an image based on the merged image data, and
    executing a first mode or a second mode selectively,
    wherein the first mode comprises forming the merged image data before storing the original image data, storing the merged image data, and then forming an image based on the stored merged image data,
    wherein the second mode comprises storing the original image data, then forming the merged image data, and then forming an image based on the merged image data,
    wherein the second mode is executed when a proof mode to print a test sheet is specified, and
    wherein when the proof mode to print the test sheet ends, the merged image data formed by executing the second mode is stored.

4. The image processing method of claim 3, further comprising:
    setting one of the first mode and the second mode by a selection prior to executing one of the first mode and the second mode,
    wherein one of the first mode and the second mode is executed according to the selection.

5. A non-transitory computer-readable medium having stored thereon a program that is executable by a computer to perform functions comprising:
    obtaining an original image and outputting original image data of the original image,
    merging unique additional image data to the original image data so as to form merged image data on a page basis, the unique additional image data being data to be added page by page,
    specifying a position to which the additional image data is merged,
    finely adjusting the specified position to which the additional image data is merged,
    storing at least one of the original image data and the merged image data,
    forming an image based on the merged image data, and
    executing one of a first mode and a second mode selectively,
    wherein the first mode comprises forming the merged image data before storing the original image data, storing the merged image data, and then forming an image based on the stored merged image data, and
    wherein the second mode comprises storing the original image data before forming the merged image data, forming the merged image data, and then forming an image based on the merged image data,
    wherein the second mode is executed when a proof mode to print a test sheet is specified, and
    wherein when the proof mode to print the test sheet ends, the merged image data formed by executing the second mode is stored.

6. The computer-readable medium of claim 5, wherein the program further controls the computer to carry out the function of:

setting one of the first mode and the second mode by a selection prior to executing one of the first mode and the second mode, wherein one of the first mode and the second mode is executed according to the selection.

* * * * *